June 2, 1964 W. CARLS 3,135,290
MANIFOLD CONSTRUCTION
Filed Nov. 14, 1960 2 Sheets-Sheet 1
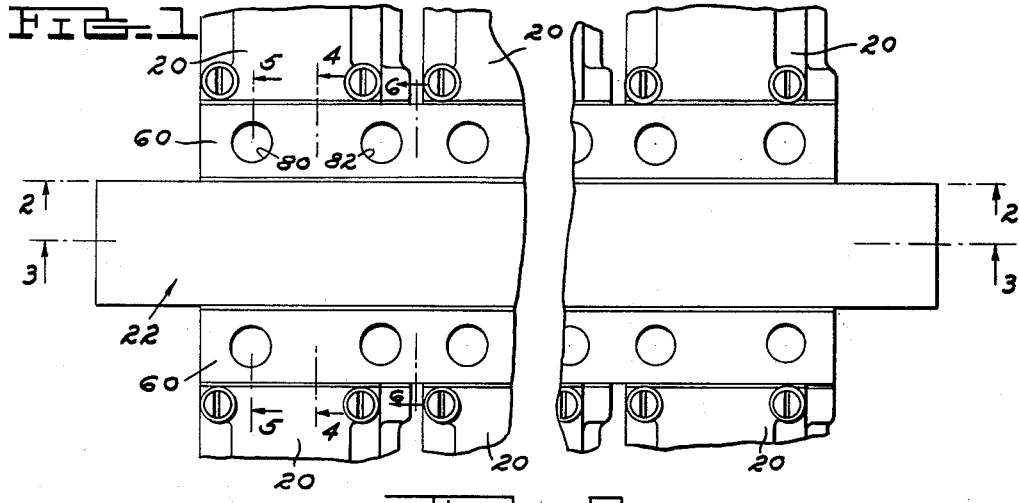
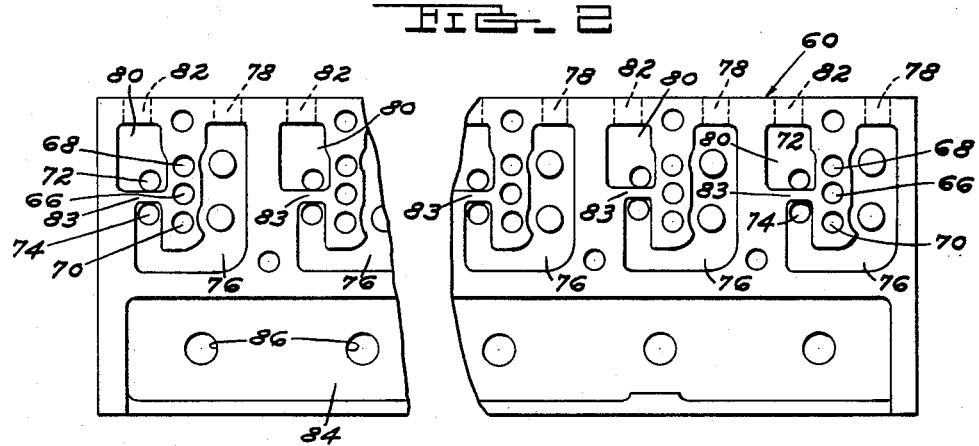
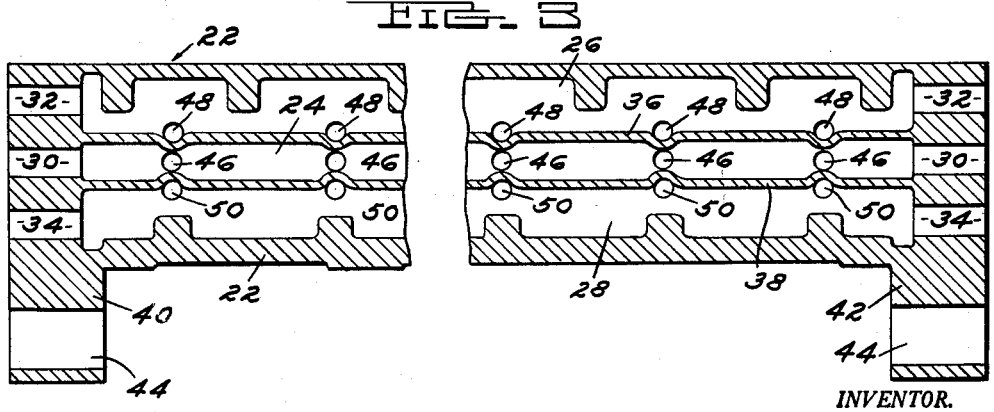
INVENTOR.
WILLIAM CARLS
BY
Barnes, Kisselle, Raisch & Choate
ATTORNEYS June 2, 1964   W. CARLS   3,135,290
MANIFOLD CONSTRUCTION
Filed Nov. 14, 1960   2 Sheets-Sheet 2

INVENTOR.
WILLIAM CARLS
BY
Barnes, Kisselle,
Raisch & Choate
ATTORNEYS

United States Patent Office 3,135,290
Patented June 2, 1964

3,135,290
MANIFOLD CONSTRUCTION
William Carls, Highland, Mich.
Filed Nov. 14, 1960, Ser. No. 69,107
3 Claims. (Cl. 137—608)

This invention relates to a manifold, particularly for air valves, and it is an object of the invention to provide a simpler manifold construction which increases the number of valves which can be mounted in a particular area. The manifold is especially adapted for use in industrial plants where control valves are utilized to direct actuating fluid to various piston-cylinder power devices on automatic equipment. The controlling air valves can be mounted side by side on the manifold and actuated manually or by solenoid controls.

It is an object to provide a manifold which has a very simplified coring for castings and in which on each side of a central element identical pieces can be placed to provide a mount for both sides of a manifold.

Another feature of the invention is the use of open-faced coring on two side plates so that the molding of the corings is materially simplified and the number of rejects on molding is reduced to practically nothing.

Other objects and features of the invention relating to details of construction and operation will be apparent in the following description and claims.

Reference is made to my co-pending application Serial No. 69,106, filed Nov. 14, 1960, wherein related subject matter is disclosed and claimed.

Drawings accompanying the disclosure and the various views thereof may be briefly described as:

FIGURE 1, a side elevation of a manifold showing the assembly with valve housings.

FIGURE 2, a sectional view on line 2—2 of FIGURE 1 showing the internal coring on one of the manifold side plates.

FIGURE 3, a sectional view showing the internal coring of the center member of the assembly taken on line 3—3 of FIGURE 1.

Figure 4:
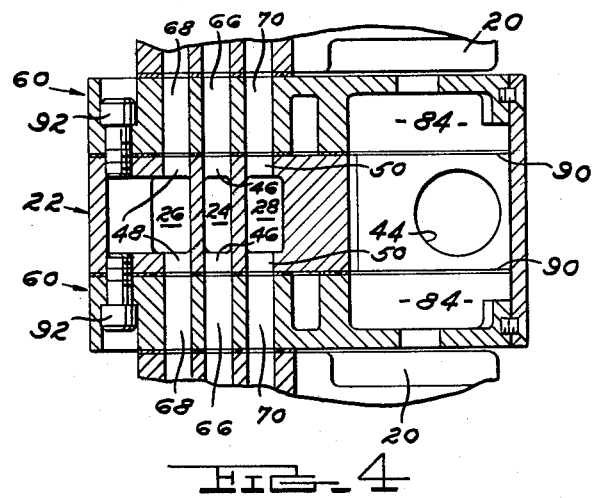
Figure 5:
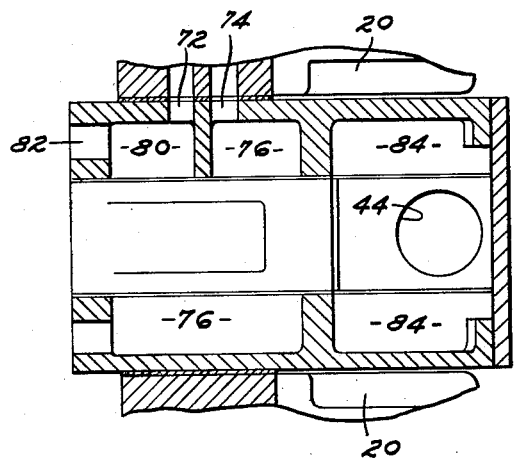
Figure 6:
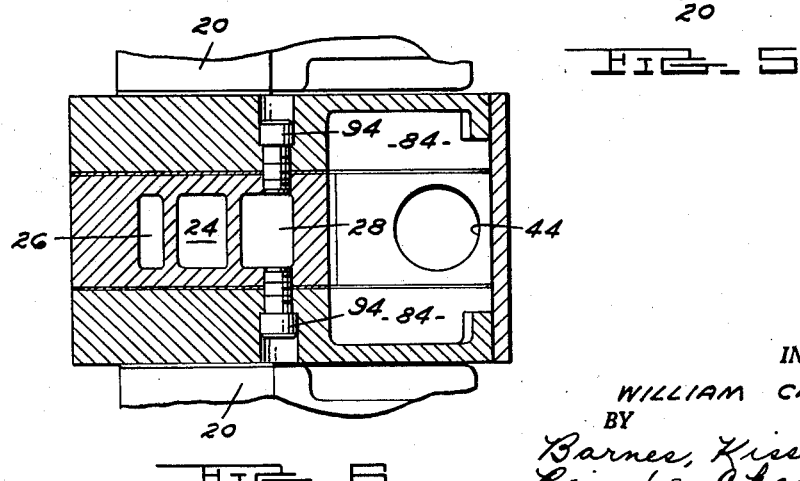

FIGURES 4, 5 and 6, transverse sections of the assembly taken on lines 4—4, 5—5 and 6—6 of FIGURE 1.

Referring to the drawings:

The manifold to be described is used for air valves which are mounted at spaced stations along the manifold, each station having five grouped holes comprising three aligned holes, the center of which is a pressure supply port and the one on either side of the center being an exhaust port, and, beside the three aligned holes, two aligned holes, one of which serves a first cylinder port and the other of which serves a second cylinder port. Thus, each station has a group of five holes which align with holes in the base of a valve housing 20.

The manufacture of one piece manifolds involve very intricate coring which results in a great many scrap parts.

The present invention simplifies the manifold construction and also makes it possible to mount valves on each side of the manifold by providing an elongate central body member 22 which, as shown in FIGURE 3, has longitudinal passages including a central pressure passage 24, one exhaust passage 26 and a second exhaust passage 28, each of which terminates at ports 30, 32 and 34 respectively at each end. While these passages could be drilled, it is feasible to core them so that less metal is required in the central body.

Each passage 24, 26 and 28 passes through the entire body longitudinally, the passages being separated by walls 36 and 38. At each end of the body side projections 40 and 42 apertured at 44 provide a chamber for electrical conduit work used in solenoid control.

At each valve station, it will be seen that a pressure port 46 is provided aligned with exhaust ports 48 and 50 respectively to provide longitudinally spaced grouped ports. The body 22 is sandwiched between two valve mounting plates 60. Each mounting plate has at a valve station the pressure port 66 with adjacent exhaust ports 68 and 70 to register with similar ports 46, 48 and 50 of the body 22. In FIGURE 2, one plate 60 is being viewed from the bottom but visible here are the grouped cylinder ports 72 and 74 adjacent the grouped ports 66, 68 and 70, which form the group of five for the valve station.

It will be seen that the cylinder port 74 is connected to the side of the mounting plate 60 by a J-shaped passage 76, which terminates at the side edge of the plate 60 at a port 78 for each valve station.

The other cylinder port 72 is connected by a passage 80 to a port 82. Thus together the passages 76 and 80 form a U-shaped recess with one leg interrupted by the separating wall 83. Thus, with simple coring and drilled holes the passages are complete for the valve station.

The mounting plate 60 is designed to overlie the entire area enclosed by body 22 and is provided with a shallow recess 84 which, with the space between the projections 40 and 42 of the body 22, provides the conduit chamber. Suitable openings 86 into recess 84 for the passage of wires from the valves are ported into the top of plate 60. The chamber thus formed may be suitably closed by a plate 85 along the side of the assembly (FIGURE 4). It will be seen that the mounting plate 60 can be applied to each side of the body 22 without revision, thus simplifying the structure of the double manifold. The mounting plates are suitably screwed to the body 22 with interposed gaskets 90 shown in FIGURES 4, 5 and 6. Screws 92 and 94 illustrate the means by which the plates can be held to the body. These screws can pass completely through from one plate 60 to another, making it possible to use fewer screws if desired.

In FIGURES 4, 5 and 6, the various passages referred to above are shown in sectional views.

It will thus be seen that by applying the two mounting plates 60 to the body 22 a double-sided manifold is provided. On the other hand, it is also possible to use only one side by drilling holes in only one side of the body 22 and applying one plate 60 to that side. The simple coring in the central body 22 provides no manufacturing problem and the more complicated coring in plate 60 is simplified because it is on an outside surface of the plate as it is being formed.

I claim:

1. A manifold construction which comprises a central flat body having a plurality of internal, longitudinally extending passages serving as exhaust, pressure, and exhaust passages respectively, transverse passages in said body longitudinally spaced along said body intersecting said respective passages from each side and an outer mounting plate having a configuration wherein it may be applied to each side of said central body and having longitudinally-spaced passages to extend said longitudinally spaced passages of said body to the outer surface of said mounting plate, said mounting plate also having cylinder passages originating at spaced openings on the outer face of said mounting plate adjacent the longitudinally spaced passages therein and terminating at spaced points on one edge of said mounting plate, said mounting plate being adapted to be applied to each side of said central body to provide valve station mounting areas on both sides of said assembly, said cylinder passages being open-cored to the inner faces of said mounting plates wherein the application of the mounting plates to the body completes said passages.

2. A manifold construction which comprises a central flat body having a plurality of internal, longitudinally extending passages serving as exhaust, pressure, and exhaust passages respectively, transverse passages in said body longitudinally spaced along said body intersecting said respective passages from each side, and outer mounting plates to be applied to each side of said central body, having longitudinally spaced passages to extend said longitudinally spaced passages of said body to the outer surface of said mounting plates, said outer mounting plates also having cylinder passages originating at spaced openings on the outer face of said mounting plates adjacent the longitudinally spaced passages therein and terminating at spaced points on one edge of said mounting plates, said mounting plates being adapted to be applied to each side of said central body to provide valve station mounting areas on both sides of said body, said cylinder passages being open-cored to the inner faces of said mounting plates wherein the application of the mounting plates to the respective sides of said body completes said passages, and said cylinder passages forming together a U-shaped passage with one leg of the U interrupted by a separating wall.

3. A manifold construction for the support of a plurality of valves on one or both sides of a single manifold which comprises, a central body provided with parallel, internal, longitudinally-extending passages serving, respectively, as exhaust, pressure, and exhaust passages, said body having parallel faces on opposed sides, each with a plurality of valve stations defined by grouped surface ports spaced transversely and extending through said body and each intercepting one of said longitudinally extending passages, and mounting plates to overlie and contact the faces of said body, each plate having an outer face and a contact face, said plates having grouped ports extending therethrough spaced to register with the grouped surface ports of said body and to form continuations thereof, said plates having additional grouped ports in the outer face to serve as cylinder ports spaced from but adjacent said first ports, said additional cylinder ports each being connected to a port at an edge of each plate by a passage cored into the contact face of each said plate and completed by the parallel faces of said body with which each plate lies in contact.

References Cited in the file of this patent

UNITED STATES PATENTS 2,871,886    Obrebski _____ Feb. 3, 1959

FOREIGN PATENTS 1,071,287    France _____ of 1954